US012381348B2

(12) United States Patent
Zhang et al.

(10) Patent No.: US 12,381,348 B2
(45) Date of Patent: Aug. 5, 2025

(54) CROWN SPRING TERMINAL, ELECTRICAL CONNECTOR SOCKET, AND ELECTRICAL CONNECTOR

(71) Applicant: Phoenix Contact Asia-Pacific (Nanjing) Co., Ltd., Nanjing (CN)

(72) Inventors: Jianli Zhang, Nanjing (CN); Haiqiong Dai, Nanjing (CN); Huawei Song, Nanjing (CN)

(73) Assignee: Phoenix Contact Asia-Pacific (Nanjing) Co., Ltd., Nanjing (CN)

( * ) Notice: Subject to any disclaimer, the term of this patent is extended or adjusted under 35 U.S.C. 154(b) by 287 days.

(21) Appl. No.: 18/044,531

(22) PCT Filed: Dec. 14, 2020

(86) PCT No.: PCT/CN2020/136023
§ 371 (c)(1),
(2) Date: Mar. 8, 2023

(87) PCT Pub. No.: WO2022/052350
PCT Pub. Date: Mar. 17, 2022

(65) Prior Publication Data

US 2024/0022012 A1 Jan. 18, 2024

(30) Foreign Application Priority Data

Sep. 9, 2020 (CN) ......................... 202021962356.0

(51) Int. Cl.
*H01R 13/187* (2006.01)
*H01R 13/11* (2006.01)
(Continued)

(52) U.S. Cl.
CPC ......... *H01R 13/187* (2013.01); *H01R 13/111* (2013.01); *H01R 13/18* (2013.01); *H01R 13/2492* (2013.01)

(58) Field of Classification Search
None
See application file for complete search history.

(56) References Cited

U.S. PATENT DOCUMENTS 6,062,919 A 5/2000 Trafton
8,734,167 B2 * 5/2014 Aimoto .................. H01R 12/91 439/74

(Continued)

FOREIGN PATENT DOCUMENTS

CN 106450877 A 2/2017
CN 107528149 A 12/2017

(Continued)

OTHER PUBLICATIONS

International Search Report and Written Opinion of International Application No. PCT/CN2020/136023, including partial translation thereof, dated Jun. 16, 2021, 11 Pages.

(Continued)

*Primary Examiner* — Ross N Gushi
(74) *Attorney, Agent, or Firm* — The Roy Gross Law Firm, LLC; Roy D. Gross

(57) ABSTRACT

The present disclosure describes a crown spring terminal, comprising: two connection bands respectively located at two ends of the crown spring terminal; and a plurality of spring lamellae arranged between the two connection bands and electrically connected to at least one of the two connection bands, wherein the plurality of spring lamellae comprise: simply supported beam and cantilever beam; and connection portion provided between at least one pair of adjacent simply supported beam and cantilever beam, to be used for providing electric connection between the at least one pair of adjacent simply supported beam and cantilever beam.

19 Claims, 4 Drawing Sheets

(51) Int. Cl.
*H01R 13/18* (2006.01)
*H01R 13/24* (2006.01)

(56) References Cited

U.S. PATENT DOCUMENTS

| | | | |
|---|---|---|---|
| 2006/0062919 | A1 | 3/2006 | Long et al. |
| 2008/0268717 | A1 | 10/2008 | Mao |

FOREIGN PATENT DOCUMENTS

| | | | |
|---|---|---|---|
| CN | 107658600 | A | 2/2018 |
| CN | 107819225 | A | 3/2018 |
| CN | 109193219 | A | 1/2019 |
| EP | 0442639 | A2 | 8/1991 |
| JP | H02219615 | A | 9/1990 |
| JP | H03236175 | A | 10/1991 |
| JP | 2016081583 | A | 5/2016 |
| JP | 2018133158 | A | 8/2018 |

OTHER PUBLICATIONS

Extended Search Report from counterpart European Application No. 20953135.9 dated Aug. 21, 2024, 30 pp.

Office Action, and translation thereof, from counterpart Japanese Application No. 2023515611 dated Aug. 27, 2024, 8 pp.

* cited by examiner

CROWN SPRING TERMINAL, ELECTRICAL CONNECTOR SOCKET, AND ELECTRICAL CONNECTOR

This application is a national stage application under 35 U.S.C. § 371 of International Application No. PCT/CN2020/136023, filed Dec. 14, 2020, which claims priority of Chinese Patent Application No. 202021962356.0, filed Sep. 9, 2020. The entire contents of each of Application Nos. PCT/CN2020/136023 and CN 202021962356.0 are incorporated herein by reference.

TECHNICAL FIELD

This disclosure relates to an electrical connector, in particular to a crown spring terminal, an electrical connector socket using the crown spring terminal, and an electrical connector.

BACKGROUND

In the technical field of electrical connectors, there is a type of electrical connector in which a crown spring terminal is arranged within an electrical connector socket, and a conductive connection between the electrical connector socket and a mating plug pin is realized by the use of the crown spring terminal. This type of electrical connector is widely used in electronics and electrical equipment.

The crown spring terminal is generally formed in a cylindrical shape, and rectangular spring lamellae are arranged between connection bands at its two ends. Moreover, protruding contact points are formed in the middle of the spring lamellae, toward the inner axis center of the cylinder, and these contact points are to be in electrical contact with an external plug pin to conduct on the circuit. Because the number of contact points which can be provided within these crown spring terminals is limited, the contact resistance is still relatively large, and the insertion force between the mating plug pin and the electrical connector socket is also relatively large, so the structure of these crown spring terminals has been unable to meet the increasingly higher requirements for contact resistance and insertion force under condition of large current transmission.

In addition, the crown spring terminal has its smallest inner diameter in the middle of the spring lamella, which is inclined to wear and yield during the course of multiple insertions and extractions, which will lead to unstable insertion force. This structure limits the service life of the crown spring terminal.

Therefore, these crown spring terminals still have deficiencies in the aspects of conduction capacity and service life, and cannot meet the demand of large contact area, strong conduction capacity, and longer service life for high-performance and high-precision electrical equipment.

SUMMARY

The present disclosure is made in view of the above existing problems, and one of its objectives is to provide a high current-carrying crown spring terminal with a larger contact area.

Yet another object of the present disclosure is to provide a high current-carrying crown spring terminal with a longer service life.

Based on the above purpose, the present disclosure provides a crown spring terminal, it comprises: two connection bands respectively located at two ends of the crown spring terminal; and a plurality of spring lamellae arranged between the two connection bands and electrically connected to at least one of the two connection bands, wherein the plurality of spring lamellae comprise: simply supported beam and cantilever beam; and connection portion provided between at least one pair of adjacent simply supported beam and cantilever beam, to be used for providing electric connection between the at least one pair of adjacent simply supported beam and cantilever beam.

Further, the crown spring terminal is a cylindrical body, and the connection portion is located in the middle of the cylindrical body, and has a depression which is formed, relative to the inner surface of the cylindrical body, depressing toward the outer surface.

Further, the plurality of spring lamellae comprise a first simply supported beam, a first cantilever beam, and a second cantilever beam, the first simply supported beam being arranged between the first cantilever beam and second cantilever beam, and forming an composite body with the first and second cantilever beams.

Further, the first simply supported beam is electrically connected to the first and second cantilever beams respectively through the connection portion.

Further, the crown spring terminal comprises a plurality of composite bodies, and at least one additional simply supported beam and/or at least one additional cantilever beam is included between the at least one pair of adjacent composite bodies.

Further, at least one of the first cantilever beam, the second cantilever beam, and the additional cantilever beam has at least one free end.

Further, wherein the at least one additional cantilever beam has two free ends.

Further, the free end has a spindle structure, wherein, along the length direction of the at least one cantilever beam, the thickness of the spindle structure gradually becomes thinner from the middle of the spindle structure to the end of the free end, and the width of the spindle structure gradually decreases from the middle of the spindle to both sides.

Further, the spindle structure further has a through-hole extending along the length direction of the at least one cantilever beam.

Further, the through-hole is formed in a spindle shape.

Further, at least one simply supported beam of the first simply supported beam and the additional simply supported beam has at least one section of through-hole extending along its length direction.

Further, the at least one section of through-hole includes three discrete sections of through-hole.

Further, the crown spring terminal is a cylindrical body, and the connection band is provided with at least one protrusion relative to the outer surface of the cylindrical body, at a position corresponding to at least one of the two ends of the cantilever beam.

Further, the connection band is further provided with at least one protrusion relative to the outer surface of the cylindrical body, at a position corresponding to at least one of the two ends of the simply supported beam.

The present disclosure further provides an electrical connector socket, it comprises: an outer sleeve; and a crown spring terminal according to the above, wherein the crown spring terminal is located within the outer sleeve.

The present disclosure further provides an electrical connector, it comprises: a plug pin; and an electrical connector socket according to claim 15, for electrically connection with said plug pin.

BRIEF DESCRIPTION OF THE DRAWINGS

In order that the disclosure can be understood in detail, a more particular description of the disclosure, briefly summarized above, may be had by reference to examples, some of which are illustrated in the accompanying drawings, in order to facilitate understanding, where possible the same reference numerals have been used to indicate the same elements common to each figure. It is to be noted, however, that the appended drawings illustrate only typical examples of this disclosure and are therefore not to be considered limiting of its scope, for the disclosure is to allow other equivalent examples.

Figure 1:
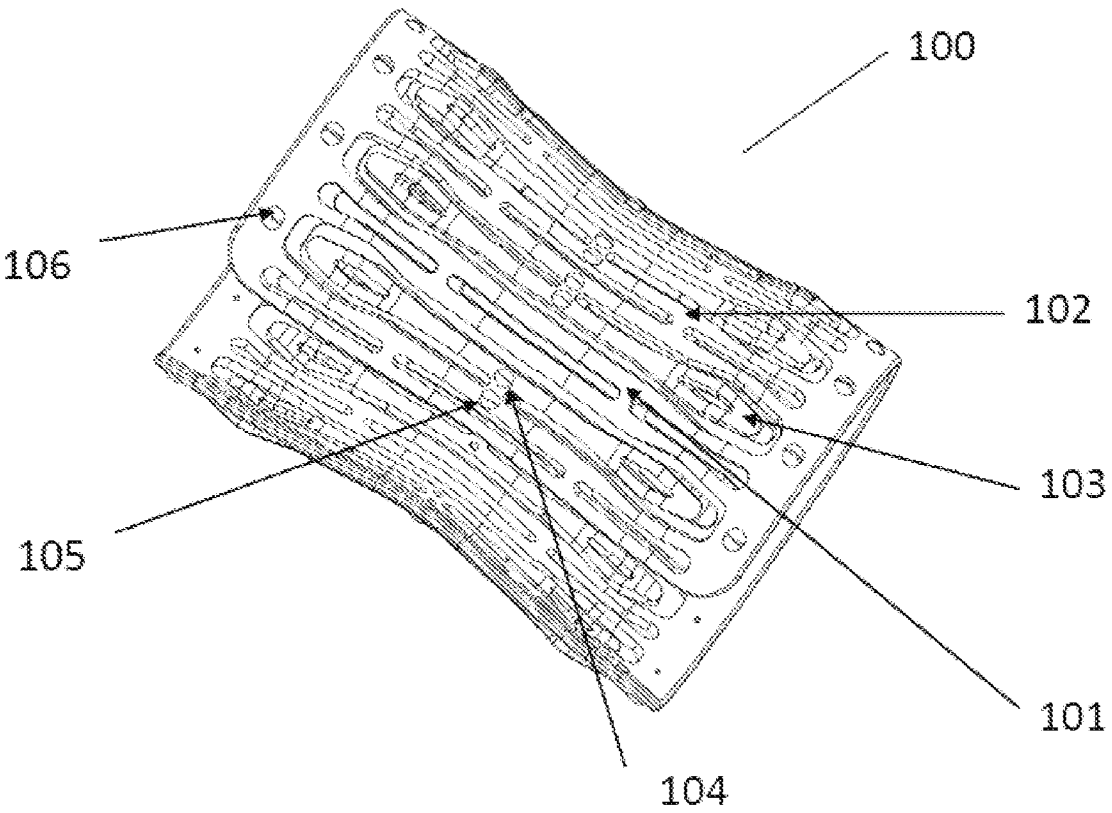
FIG. 1 is a perspective view of a crown spring terminal according to an example of the present disclosure when being curled into a cylindrical body.

It is contemplated that elements of one example of the disclosure may be beneficially utilized on other examples without further recitation.

REFERENCE SIGNS

100 crown spring terminal
101, 102 simply supported beam
103 cantilever beam
103*a* spindle structure
103*b* through-hole
104 connection portion
105, 106 protrusion
200 electrical connector
201 electrical connector socket
202 plug pin
203 outer sleeve

DETAILED DESCRIPTION

Specific examples are described below, and those skilled in the art can clearly understand other advantages and technical effects of the present disclosure from the content disclosed in this specification. In addition, the present disclosure is not limited to the following specific examples, and can also be implemented or applied through other different examples, and, for each specific content in this specification, various modifications can be made without departing from the spirit of the present disclosure.

Hereinafter, specific examples of the present disclosure will be described in detail based on the drawings. The enumerated drawings are only for simple illustration, not drawn according to the actual size, and do not reflect the actual size of the related structures, which shall be explained in advance.

Figure 2:
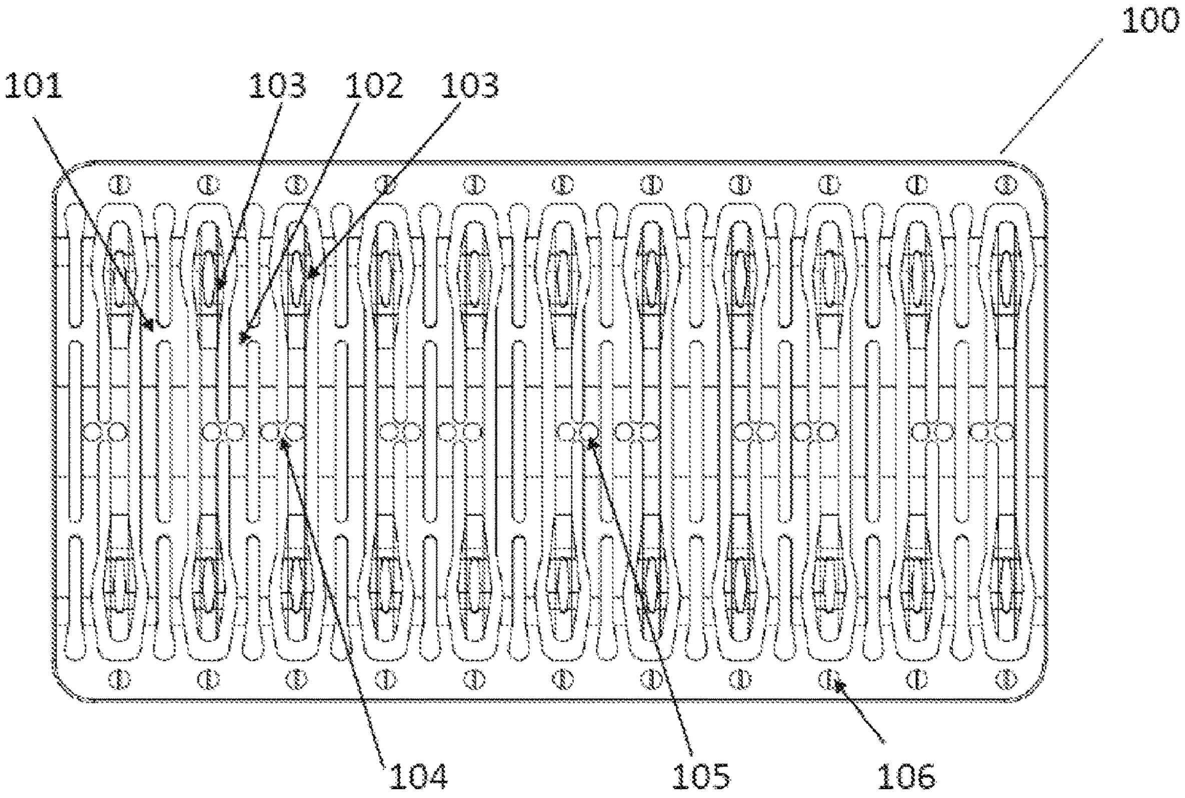
FIG. 2 is a schematic plan view of a crown spring terminal according to an example of the present disclosure when being flattened.

FIG. 1 is a perspective view of a crown spring terminal according to an example of the present disclosure when being curled into a cylindrical body. FIG. 2 is a schematic plan view of a crown spring terminal according to an example of the present disclosure when being flattened, wherein the shown plane corresponds to the outer surface of the cylindrical body shown in FIG. 1, and the unshown plane corresponds to the inner surface of the cylindrical body shown in FIG. 1.

As shown in FIGS. 1 and 2, in some examples, the crown spring terminal 100 can be curled to form a cylindrical body, with connection bands at its both ends, and, a plurality of simply supported beams 101, 102 and a plurality of cantilever beams 103 may be provided between the connection bands at both ends. For at least one pair of adjacent simply supported beam 102 and cantilever beam 103, their respective middle portions are electrically connected to each other through connection portion 104. By adopting this design, the width of respective simply supported beam and cantilever beam can be significantly reduced, so that the number of simply supported beams and cantilever beams can be set as much as possible in the circumferential direction of the cylindrical body, meanwhile maintaining or even increasing contact area with mating plug pin. In some examples, the connection portion 104 may be offset from the middle of the simply supported beam 102 and the cantilever beam 103.

In some other examples, a protrusion 105 is formed on the connection portion 104 in a direction away from the axis center of the cylindrical body, that is, protrudes outward from the paper in FIG. 2. When viewed from the inner surface of the cylindrical body, the protrusion 105 can also be seen as a depression formed towards the outer surface of the cylindrical body. The protrusion 105 may be formed into a spherical protrusion, or may be formed into other shapes such as a rectangular shape. The number of protrusions 105 can be one, or two or more. In the prior art, electrical connection with an external plug pin is made by using the contact point protruding toward the axis center of the cylindrical body provided on the spring lamella, and with such structure, the electrical contact between the middle part of the crown spring terminal and the external plug pin is formed such that each of the above-mentioned contact points makes point contact with the external plug pin. On the contrary, in the present disclosure, the connection portion 104 is provided with a protrusion facing away from the axis center of the cylindrical body, that is, a depression formed toward the outer surface when viewed from the inner surface of the cylindrical body. Thus, regarding the electrical contact between the middle portion of the crown spring terminal and the external plug pin, in some examples, at least a part of the periphery of the recess can be formed to make multi-point contact with the external plug pin. Furthermore, in some examples, the entire periphery of the recess can also be formed to have a closed circular contact with the external plug pin, thereby significantly increasing the electrical contact area and greatly improving the electrical performance.

As shown in FIG. 2, in some examples, at least one composite body can be formed in the crown spring terminal 100. Each composite body can be composed of one simply supported beam 102 and two cantilever beams 103. Each of the simply supported beam 102 and the cantilever beam 103 can be formed, at the position of the connection portion 104, to have an annular-zone depression towards the inside of the paper, so as to provide better electrical contact with the external plug pin during use. By adopting this unique composite structure, the width of each simply supported beam and cantilever beam can be further reduced, and a maximum number of simply supported beams and cantilever beams can be set within a limited space, thereby achieving the most contact locations and contact areas, and obtaining an optimal current flux performance. In some examples, at least one additional simply supported beam 101 and/or at least one additional cantilever beam can be arranged between adjacent composite bodies, and said additional simply supported beam and cantilever beam are, at the annular-zone depression, electrically isolated with adjacent spring lamella. In some examples, in the recessed part of the annular zone, as in the prior art, a protrusion facing the axis center of the cylindrical body may also be provided on the connection portion 104 of the composite body, the additional simply supported beam 102 and the cantilever beam 103, that is, as viewed in FIG. 2, further depressed inwardly of the paper surface. Thus, even if the protrusions toward the axis center of the cylindrical body as in the prior art are adopted, due to the above-mentioned special composite body structure of the present disclosure, the number of simply supported beams and cantilever beams is significantly increased, so the number of protrusions can be increased accordingly, thereby increasing the contact area with the mating plug pin. As used herein, referring to FIG. 2, the simply supported beam refers to a beam with two ends respectively fixedly connected to the two connection bands.

In some examples, the simply supported beams 101, 102 may be provided with at least one section of through-hole along their own extending direction. As shown in FIG. 2, this example gives an example of forming three sections of through-hole in each simply supported beam 101, 102, thereby forming a hollow structure in the simply supported beam. By adopting this hollow structure, the local stress concentration can be significantly reduced, and the local plastic deformation of the simply supported beam can be relieved, thereby prolonging the insertion and extraction life term of the crown spring terminal. In some examples, one or two sections of through-hole may be provided along at least one simply supported beam.

In some examples, at least one of the two ends of the cantilever beam 103 can be formed as a free end. In the example shown in FIG. 2, the cantilever beam 103 is configured as a structure with both ends being free ends. At least one free end of the cantilever beam 103 may be formed as a spindle structure. Regarding this spindle structure, it can be set so that its width becomes gradually smaller from the center portion to both sides, and the center portion can be formed to be convex toward the outside of the paper surface, thereby increasing the contact area with outer sleeve 203 which is to be described later, so as to achieve more reliable electrical contact with the outer sleeve 203 described later.

Figure 3:
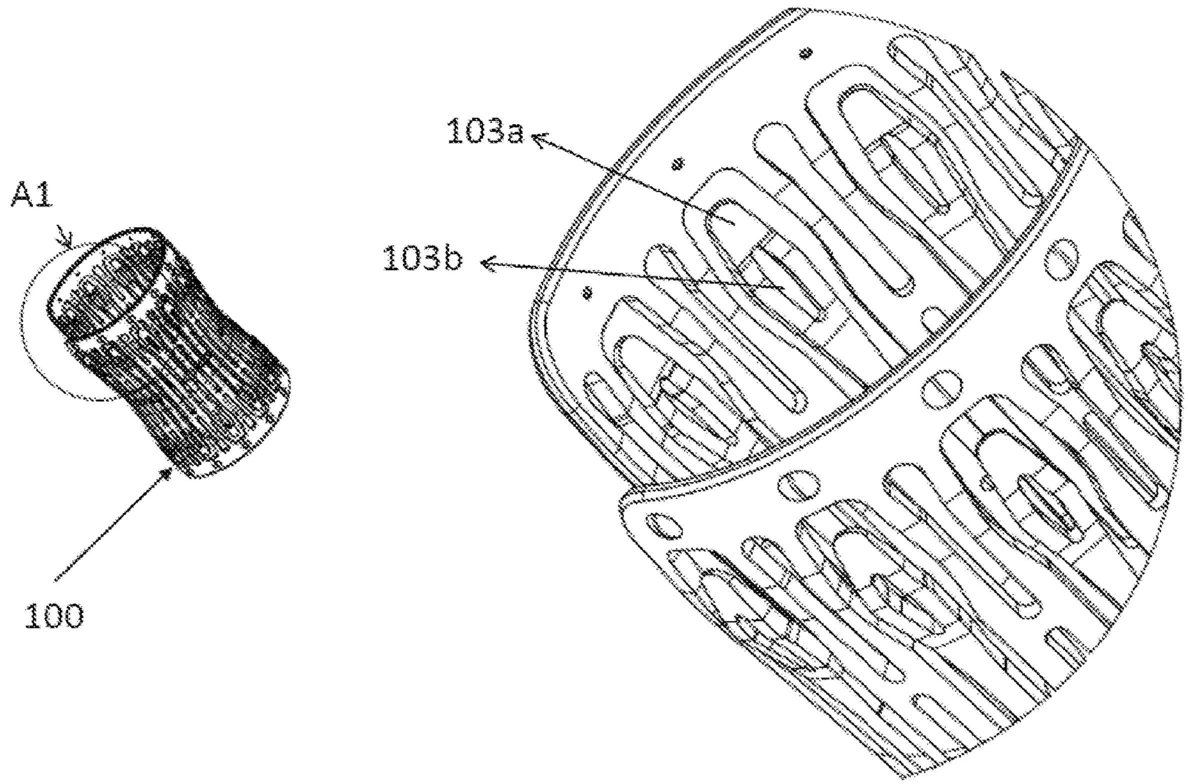
FIG. 3 is an enlarged view of a partial structure of a crown spring terminal according to an example of the present disclosure.

Further, FIG. 3 illustrates a partial enlarged view of the cantilever beam obtained by enlarging the A1 portion of the left crown spring terminal 100.

In some examples, as shown in FIG. 3, the thickness of the spindle structure 103*a* of the cantilever beam 103 is set to gradually become thinner along the length direction of the cantilever beam 103 from the central part of the spindle structure to the end of the free end. In some examples, the inner surface of the central part of the spindle structure 103*a* can be set to protrude from the inner surface of the crown spring terminal 100, and the inner surface of the free end can be set to be flush with the inner surface of the crown spring terminal 100, or be indented. In some other examples, the spindle structure 103*a* may have a through-hole 103*b* along the length direction of the cantilever beam 103, and the through-hole 103*b* may be formed in a spindle shape. By adopting the spindle structure or the spindle structure with through-hole, the local stress concentration can be significantly reduced, the local plastic deformation of the cantilever beam can be relieved, and better flexibility and longer insertion and extraction service term can be provided. Moreover, by designing the thickness of the spindle body as described above, it is possible to avoid touching the free end when an external plug pin is inserted, avoiding damage to the crown spring terminal, and significantly improving reliability. In some examples, as shown in FIG. 2, in the connection band located at the upper and lower ends of the cylindrical body, at least one protrusion 106 is formed at a position corresponding to at least one of the two ends of the cantilever beam 103. This example shows an example in which one protrusion 106 is formed at each of positions corresponding to both ends of each cantilever beam 103. Likewise, the protrusion 106 may be formed into a spherical shape, or may be formed into other shapes such as a rectangular shape. By providing the protrusion 106, more reliable contact with outer sleeve 201 to be described later can be provided. In some other examples, at least one additional protrusion may also be formed at a position corresponding to at least one end of the simply supported beam 102.

In some examples, the crown spring terminal 100 can be formed into a vertically symmetrical structure, so that there is no need to distinguish the assembly direction, which reduces assembly difficulty and assembly cost.

Figure 4:
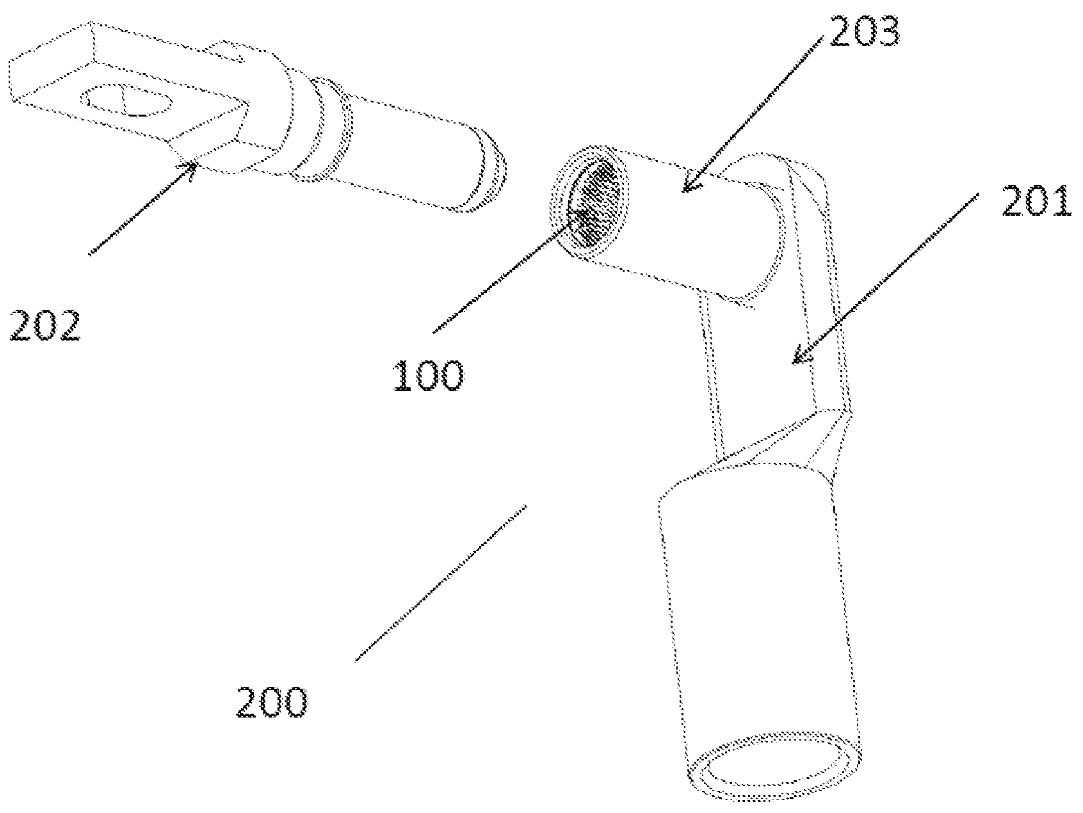
FIG. 4 is a schematic diagram of an electrical connector according to an example of the disclosure.

FIG. 4 illustrates an electrical connector 200 using a crown spring terminal according to an example of the present disclosure. In some examples, the electrical connector 200 includes an electrical connector socket 201 and plug pin 202, the electrical connector socket 201 may include an outer sleeve 203, and a curled state crown spring terminal assembled within the outer sleeve 203, wherein the inner surface of the outer sleeve 203 has an electrical connection portion, which is to be electrically connected to the connection bands at both ends of the crown spring terminal 100, as well as the middle of the spindle body of the cantilever beam provided within the crown spring terminal 100. The outer surface of the plug pin 202 has an electrical connection portion to be electrically connected to a connection portion provided in the middle of the crown spring terminal 100 (for example, the portion including the protrusion 105 in FIG. 2). When the plug pin 202 is inserted into the electrical connector socket 201, the electrical connection portion of the plug pin 202 is electrically connected to the connection portion 104 of the crown spring terminal 100 that includes the above-mentioned protrusion at the central annular zone. Because the electrical contact between the plug pin 202 and the crown spring terminal being a surface contact at the annular zone in the middle of the crown spring terminal, it significantly increases the electrical contact area and significantly improves the electrical performance. By using various crown spring terminals 100 with the above structure, the contact area between the crown spring terminal 100 and the outer sleeve 203 and/or plug pin 202 can be increased, lower contact resistance can be achieved, and high current carrying transmission can be realized. On the other hand, by using various crown spring terminals with the above structure, since the stress concentration applied to the electrical connector 200 due to insertion and extraction is significantly reduced, a gentler insertion force can be obtained, which greatly improves the service life of the electrical connector 200.

The preferred examples of the present disclosure have been described in detail above. It should be understood, however, that various examples and modifications may be employed without departing from the broad spirit and scope of the disclosure. Those skilled in the art can make many modifications and changes according to the concept of the present disclosure without creative work. Therefore, all technical solutions obtained by those skilled in the art through logical analysis, reasoning or limited experiments on the basis of the prior art based on the concept of the present disclosure shall fall within the scope of protection defined by the claims of the present disclosure.

The invention claimed is:

1. A crown spring terminal comprising:

two connection bands respectively located at two ends of the crown spring terminal; and a plurality of spring lamellae arranged between the two connection bands and electrically connected to at least one of the two connection bands, wherein the plurality of spring lamellae comprise:

simply supported beams and cantilever beams, wherein each simply supported beam is a beam with two ends respectively fixedly connected to the two connection bands; and connection portions, wherein each connection portion is provided between a corresponding one of the simply supported beams and an adjacent one of the cantilever beams and is configured to provide an electric connection between the simply supported beam and the cantilever beam, the cantilever beam has two ends, the crown spring terminal comprises a cylindrical body, and the connection bands are provided with at least one protrusion relative to an outer surface of the cylindrical body, at a position corresponding to at least one end of one of the cantilever beams.

2. The crown spring terminal according to claim 1, wherein:

the connection portion is located in a middle of the cylindrical body, and has a depression which is formed, relative to an inner surface of the cylindrical body, depressing toward the outer surface of the cylindrical body.

3. The crown spring terminal according to claim 1, wherein:

the connection bands are further provided with at least one protrusion relative to the outer surface of the cylindrical body, at a position corresponding to at least one of the two ends of the simply supported beam.

4. The crown spring terminal of claim 1, wherein:

the simply supported beams comprise a first simply supported beam, and the cantilever beams comprise a first cantilever beam, and a second cantilever beam, the first simply supported beam being arranged between the first cantilever beam and second cantilever beam, and forming a composite body with the first and second cantilever beams.

5. The crown spring terminal of claim 4, wherein:

the first simply supported beam is electrically connected to the first and second cantilever beams respectively through two corresponding ones of the connection portions.

6. The crown spring terminal of claim 5, wherein:

the crown spring terminal comprises a plurality of composite bodies, the plurality of spring lamellae further comprise at least one additional simply supported beam each provided between two adjacent ones of the plurality of composite bodies, or the cantilever beams further comprise at least one additional cantilever beam each provided between two adjacent ones of the plurality of composite bodies.

7. The crown spring terminal of claim 6, wherein:

at least one of the first cantilever beam, the second cantilever beam, or the at least one additional cantilever beam has at least one free end.

8. The crown spring terminal of claim 7, wherein the at least one additional cantilever beam has two free ends.

9. The crown spring terminal of claim 7, wherein:

the at least one free end includes a spindle structure, wherein, along a length direction of the at least one cantilever beam, a thickness of the spindle structure gradually becomes thinner from a middle of the spindle structure to an end of the at least one free end, and a width of the spindle structure gradually decreases from the middle of the spindle to both sides of the spindle.

10. The crown spring terminal of claim 9, wherein:

the spindle structure further has a through-hole extending along the length direction of the at least one cantilever beam.

11. The crown spring terminal of claim 10, wherein: the through-hole is formed in a spindle shape.

12. The crown spring terminal of claim 6, wherein:

at least one of the first simply supported beam or the at least one additional simply supported beam has at least one section of through-hole extending along its length direction.

13. The crown spring terminal of claim 12, wherein:

the at least one section of through-hole includes three discrete sections of through-hole.

14. An electrical connector socket comprising:

an outer sleeve; and a crown spring terminal, wherein the crown spring terminal is located within the outer sleeve and comprises:

two connection bands respectively located at two ends of the crown spring terminal; and a plurality of spring lamellae arranged between the two connection bands and electrically connected to at least one of the two connection bands, wherein the plurality of spring lamellae comprise:

simply supported beams and cantilever beams, wherein each simply supported beam is a beam with two ends respectively fixedly connected to the two connection bands; and connection portions, wherein each connection portion is provided between a corresponding one of the simply supported beams and an adjacent one of the cantilever beams and is configured to provide an electric connection between the simply supported beam and the cantilever beam, the cantilever beam has two ends, the crown spring terminal comprises a cylindrical body, and the connection bands are provided with at least one protrusion relative to an outer surface of the cylindrical body, at a position corresponding to at least one end of one of the cantilever beams.

15. An electrical connector comprising:

a plug pin; and an electrical connector socket, wherein the electrical connector socket is configured to electrically connect with the plug pin and comprises:

an outer sleeve; and a crown spring terminal, wherein the crown spring terminal is located within the outer sleeve and comprises:

two connection bands respectively located at two ends of the crown spring terminal; and a plurality of spring lamellae arranged between the two connection bands and electrically connected to at least one of the two connection bands, wherein the plurality of spring lamellae comprise:

simply supported beams and cantilever beams, wherein each simply supported beam is a beam with two ends respectively fixedly connected to the two connection bands; and connection portions, wherein each connection portion is provided between a corresponding one of the simply supported beams and an adjacent one of the cantilever beams and is configured to provide an electric connection between the simply supported beam and the cantilever beam, the cantilever beam has two ends, the crown spring terminal comprises a cylindrical body, and the connection bands are provided with at least one protrusion relative to an outer surface of the cylindrical body, at a position corresponding to at least one end of one of the cantilever beams.

16. The electrical connector socket according to claim 14, wherein:

the connection portion is located in a middle of the cylindrical body, and has a depression which is formed, relative to an inner surface of the cylindrical body, depressing toward the outer surface of the cylindrical body.

17. The electrical connector socket of claim 14, wherein:

the simply supported beams comprise a first simply supported beam, and the cantilever beams comprise a first cantilever beam, and a second cantilever beam, the first simply supported beam being arranged between the first cantilever beam and second cantilever beam, and forming a composite body with the first and second cantilever beams.

18. The electrical connector socket of claim 17, wherein:

the first simply supported beam is electrically connected to the first and second cantilever beams respectively through two corresponding ones of the connection portions.

19. The electrical connector socket of claim 18, wherein:

the crown spring terminal comprises a plurality of composite bodies, the plurality of spring lamellae further comprise at least one additional simply supported beam each provided between two adjacent ones of the plurality of composite bodies, or the cantilever beams further comprise at least one additional cantilever beam each provided between two adjacent ones of the plurality of composite bodies.

* * * * *